United States Patent [19]
Kihara

[11] Patent Number: 5,999,890
[45] Date of Patent: Dec. 7, 1999

[54] VELOCITY CALCULATING APPARATUS

[75] Inventor: Takaei Kihara, Kyoto, Japan

[73] Assignee: Murata Manufacturing Co., Ltd., Japan

[21] Appl. No.: 08/957,204

[22] Filed: Oct. 24, 1997

[30] Foreign Application Priority Data

Oct. 25, 1996 [JP] Japan .................................. 8-301108

[51] Int. Cl.⁶ .................................................. G06G 7/78
[52] U.S. Cl. .......................... 702/142; 702/141; 701/214; 342/106; 342/107
[58] Field of Search ................. 702/96, 141–142, 702/165; 364/174, 528.39; 701/7, 70, 207, 300, 461.1, 121, 214–216; 73/178 R, 510–511, 507; 342/104–107, 114, 357

[56] References Cited

U.S. PATENT DOCUMENTS

| | | | |
|---|---|---|---|
| 5,025,401 | 6/1991 | Kato ........................................ | 702/165 |
| 5,337,243 | 8/1994 | Shibata et al. ........................... | 701/216 |
| 5,416,712 | 5/1995 | Geier et al. .............................. | 342/457 |
| 5,504,569 | 4/1996 | Kato et al. ............................... | 342/104 |
| 5,579,012 | 11/1996 | Iwakuni et al. .......................... | 342/117 |
| 5,597,954 | 1/1997 | Nakamura ............................... | 73/178 R |
| 5,608,631 | 3/1997 | Tsutsumi et al. ........................ | 702/148 |
| 5,708,438 | 1/1998 | Tanaka et al. ........................... | 342/104 |
| 5,856,802 | 1/1999 | Ura et al. ................................. | 342/357 |

*Primary Examiner*—Marc S. Hoff
*Assistant Examiner*—Bryan Bui
*Attorney, Agent, or Firm*—Ostrolenk, Faber, Gerb & Soffen, LLP

[57] ABSTRACT

A velocity calculating apparatus includes an acceleration sensor for detecting acceleration in the direction in which a motor vehicle travels. The acceleration sensor is connected to a CPU through an A/D converter. The CPU is connected to a GPS-signal receiver through a digital converter, and is also connected to a memory. The apparatus carries out a program for compensating for an error in the output signal of the acceleration sensor, wherein the program compensates the output signal of the acceleration sensor according to a GPS signal received from the GPS-signal receiver.

19 Claims, 3 Drawing Sheets

VELOCITY CALCULATING APPARATUS

BACKGROUND OF THE INVENTION

1. Field of the Invention

The present invention relates to velocity calculating apparatuses, and more particularly, to a velocity calculating apparatus for calculating a velocity from a signal output from an acceleration sensor, for use in a navigation system for a motor vehicle.

2. Description of the Related Art

In a conventional navigation system for a motor vehicle, the positional information of the motor vehicle is obtained from a GPS signal.

Therefore, at places where a GPS signal cannot be received, such as a tunnel, a location behind a building, and a location under an elevated railroad, the positional information of the motor vehicle cannot be obtained.

To obtain the positional information of a motor vehicle even at a place where a GPS signal cannot be received, a velocity calculating apparatus has been developed in which a signal output from an acceleration sensor detecting the acceleration of a motor vehicle is integrated in the time domain to calculate the velocity of the motor vehicle. With the use of such a velocity calculating apparatus, the velocity of a motor vehicle can be calculated even at a place where a GPS signal cannot be received, and the mileage of the motor vehicle can be obtained by integrating the calculated velocity in the time domain. Therefore, a distance traveled by a motor vehicle after a GPS signal can no longer be received, and thereby, the positional information of the motor vehicle, can be obtained with the use of the velocity calculating apparatus.

However, the velocity calculating apparatus may have a large error caused by temperature drift and the sensitivity-temperature characteristic of the acceleration sensor, and by the acceleration of gravity at a slope when a signal output from the acceleration sensor is integrated to calculate the velocity.

SUMMARY OF THE INVENTION

Accordingly, it is a main advantage of the present invention to provide a velocity calculating apparatus which can suppress an error caused by its acceleration sensor.

The foregoing advantage is achieved according to one aspect of the present invention through the provision of a velocity calculating apparatus for calculating a velocity in the traveling direction from the output signal of an acceleration sensor used for detecting acceleration in the traveling direction, wherein an error in the output signal of the acceleration sensor is compensated for according to a GPS signal. The error caused by the acceleration sensor is thereby suppressed.

The foregoing advantage is achieved according to another aspect of the present invention through the provision of a velocity calculating apparatus including: an acceleration sensor for detecting acceleration in the traveling direction; means for specifying a reference voltage to be used for compensating for an error in the output signal of the acceleration sensor; means for compensating for the error in the output signal of the acceleration sensor according to the reference voltage; means for obtaining first velocity information by integrating in the time domain the output signal which has been compensated according to the reference voltage; means for obtaining first acceleration information by differentiating the first velocity information in the time domain; means for receiving a GPS signal; means for obtaining second velocity information from the GPS signal; means for obtaining second acceleration information by differentiating the second velocity information in the time domain; means for comparing the first acceleration information with the second acceleration information; and means for changing the first velocity information according to the comparison between the first acceleration information and the second acceleration information.

In the velocity calculating apparatus, the means for changing the first velocity information may include either means for changing the reference voltage according to the comparison between the first acceleration information and the second acceleration information, or means for changing an integration constant according to the comparison between the first acceleration information and the second acceleration information, the integration constant being used in the means for obtaining the first velocity information.

In such a velocity calculating apparatus, first velocity information obtained from the output signal of an acceleration sensor is changed based on the comparison between first acceleration information obtained from the output signal of the acceleration sensor and second acceleration information obtained from a GPS signal. When the first velocity information is changed, either a reference voltage is changed according to the comparison between the first acceleration information and the second acceleration information, or an integration constant used for means for obtaining the first velocity information is changed according to the comparison between the first acceleration information and the second acceleration information. The first velocity information changed in this way is used as velocity information in the traveling direction. Therefore, an error caused by the acceleration sensor is suppressed.

The velocity calculating apparatus may further include an A/D converter connected at its input end to the output end of the acceleration sensor, for converting the output signal of the acceleration sensor to a digital signal; a digital converter for converting the GPS signal to a digital signal; a serial interface connected at its input end to the output end of the digital converter, for converting the serial data of the digital signal converted from the GPS signal to parallel data; a CPU connected to the output end of the A/D converter and the output end of the serial interface, for processing the digital signal converted from the output signal of the acceleration sensor and the digital signal converted from the GPS signal; a memory which is connected to the CPU and in which an operation program for operating the CPU is written; and a timer connected to the CPU, for measuring time.

Thus, the present invention provides a velocity calculating apparatus which can suppress an error caused by an acceleration sensor.

The foregoing and other objects, features, and advantages of the present invention will become more clear by the following, detailed descriptions of embodiments of the invention, referring to the drawings.

DESCRIPTION OF EMBODIMENTS OF THE INVENTION

Figure 1:
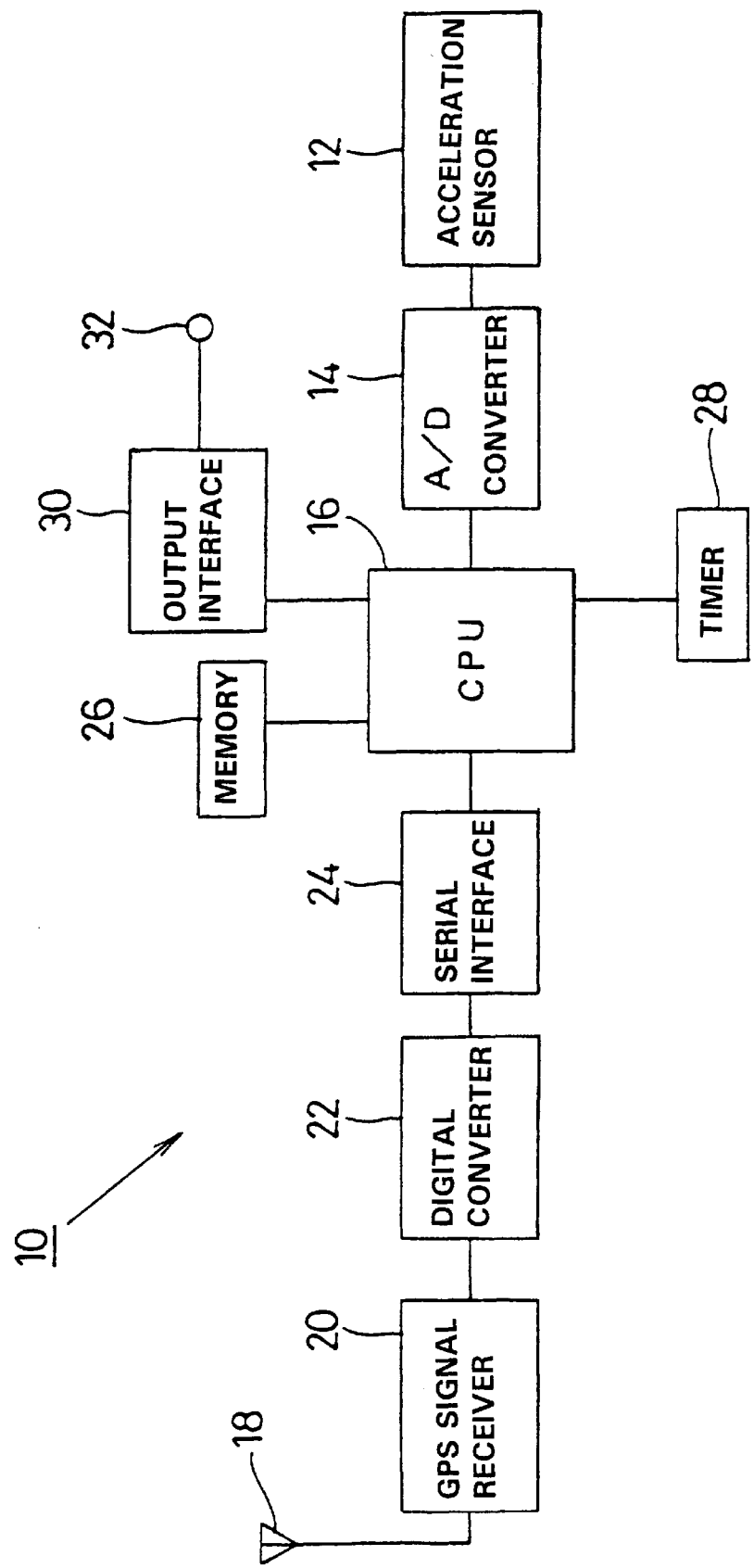
FIG. 1 is a block diagram of a velocity calculating apparatus according to an embodiment of the present invention.

FIG. 1 is a block diagram of an embodiment of the present invention. A velocity calculating apparatus 10 shown in FIG. 1 includes an acceleration sensor 12. The acceleration sensor 12 detects acceleration in the direction in which a motor vehicle travels and outputs an analog signal corresponding to the acceleration. The sensor is mounted at an appropriate position such as the chassis of the motor vehicle to detect the acceleration. A vibration gyroscope, for example, may be used as the acceleration sensor 12.

The output end of the acceleration sensor 12 is connected to the input end of an A/D converter. The A/D converter 14 converts an analog signal output from the acceleration sensor 12 to a digital signal.

The output end of the A/D converter 14 is connected to a CPU 16. The CPU 16 calculates a velocity from the output signal of the acceleration sensor 12 and compensates for the output signal of the acceleration sensor 12 according to a GPS signal.

The velocity calculating apparatus 10 also includes a GPS antenna 18. The GPS antenna 18 is mounted, for example, on the body of a motor vehicle at an appropriate position for receiving a GPS signal. The GPS antenna 18 is connected to the input end of a GPS-signal receiver 20. The GPS antenna 18 and the GPS-signal receiver 20 are used for receiving a GPS signal.

The output end of the GPS-signal receiver 20 is connected to the input end of a digital converter 22. The digital converter 22 converts a GPS signal output from the GPS-signal receiver 20 to a digital signal.

The output end of the digital converter 22 is connected to the CPU 16 through a serial interface 24. The serial interface 24 converts the serial data of a digital signal output from the digital converter 22 to parallel data to be input to the CPU 16.

The CPU 16 is connected to a memory 26 and a timer 28. The memory 26 stores an operation program. The timer 28 is used for measuring time.

The CPU 16 is also connected to an output terminal 32 through an output interface 30. The output interface 30 and the output terminal 32 output the signal corresponding to a velocity in the direction in which the motor vehicle travels.

A method of operation of the velocity calculating apparatus 10 will be described below by referring to a flowchart shown in FIG. 2.

In step S1, the acceleration sensor 12 detects acceleration in the direction in which the motor vehicle travels, and an analog output signal Vg is obtained from the output end of the acceleration sensor 12. In this case, the output signal Vg of the acceleration sensor 12 has the component corresponding to acceleration in the direction in which the motor vehicles travels, but may also include unwanted components such as a drift component and a component due to the acceleration of gravity.

In step S3, a reference voltage Vs used for compensating for the output signal Vg of the acceleration sensor 12 is specified. The reference voltage Vs is initially set to a voltage (approximately 0 V) which is output when the acceleration sensor 12 does not receive acceleration, but is changed according to a difference between the signal Va corresponding to acceleration calculated from the output signal Vg of the acceleration sensor 12 and the signal VA corresponding to acceleration calculated from a GPS signal, the difference being obtained by comparison in step S17 described later.

In step S5, the reference voltage Vs is subtracted from the output signal Vg of the acceleration sensor 12, and a signal Vg−Vs, which is generated in order to compensate the output signal Vg with the reference voltage Vs, is calculated.

In step S7, the signal Vg−Vs is integrated in the time domain to calculate the signal Vv corresponding to a velocity in the direction in which the motor vehicle travels, as first velocity information. This signal Vv is output from the output terminal 32 through the output interface 30.

In step S9, the signal Vv is differentiated in the time domain to calculate the signal Va corresponding to acceleration in the direction in which the motor vehicle travels, as first acceleration information.

In step S11, the GPS antenna 18 and the GPS-signal receiver 20 receive a GPS signal.

In step S13, the GPS signal is processed to calculate the signal VV corresponding to a velocity in the direction in which the motor vehicle travels, as second velocity information. To obtain the signal VV from the GPS signal, either positional information in the GPS signal is differentiated in the time domain, or velocity information included in the GPS signal is taken out.

In step S15, the signal VV is differentiated in the time domain to calculate the signal VA corresponding to acceleration in the direction in which the motor vehicle travels, as second acceleration information.

In step S17, the signal Va corresponding to the acceleration calculated from the output signal Vg of the acceleration sensor 12 is compared with the signal VA corresponding to the acceleration calculated from the GPS signal, and the reference signal Vs is changed in step S3 according to the difference.

Figure 2:
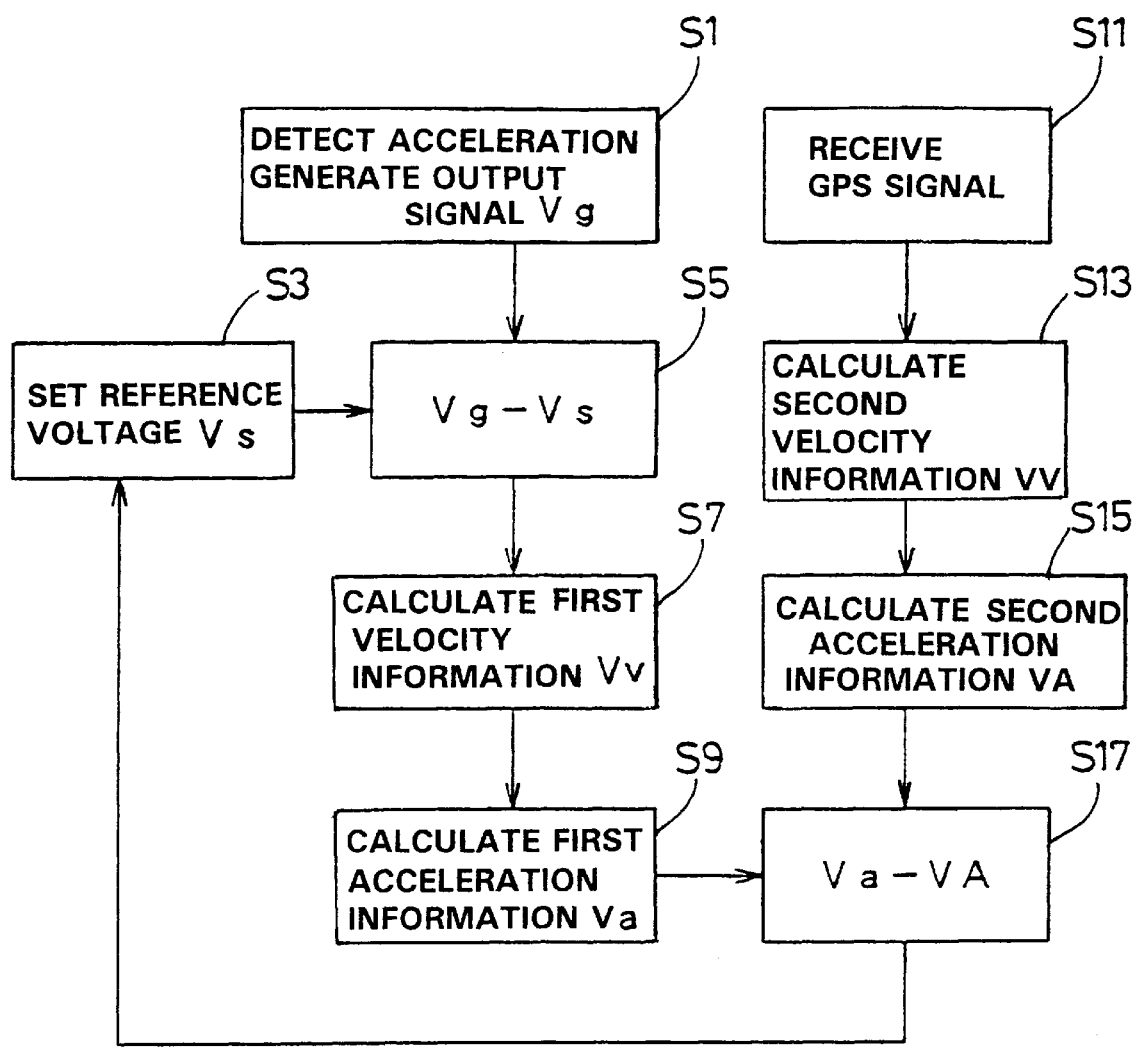
FIG. 2 is a flowchart illustrating a method of operation of the velocity calculating apparatus shown in FIG. 1.

As described above, when the velocity calculating apparatus 10 operates according to the flowchart shown in FIG. 2, the reference voltage Vs used for compensating the output signal Vg of the acceleration sensor 12 is changed according to the comparison between the first acceleration information (signal Va) obtained from the output signal Vg of the acceleration sensor 12 and the second acceleration information (signal VA) obtained from the GPS signal, which thereby changes the first velocity information (signal Vv) obtained from the output signal Vg of the acceleration sensor. Thus, the effects of temperature drift and the sensitivity-temperature characteristic of the acceleration sensor 12 and the effects of the acceleration of gravity at a slope are compensated for, whereby an error caused by the acceleration sensor 12 is suppressed.

Another method of operation of the velocity calculating apparatus 10 will be described below by referring to a flowchart shown in FIG. 3.

Figure 3:
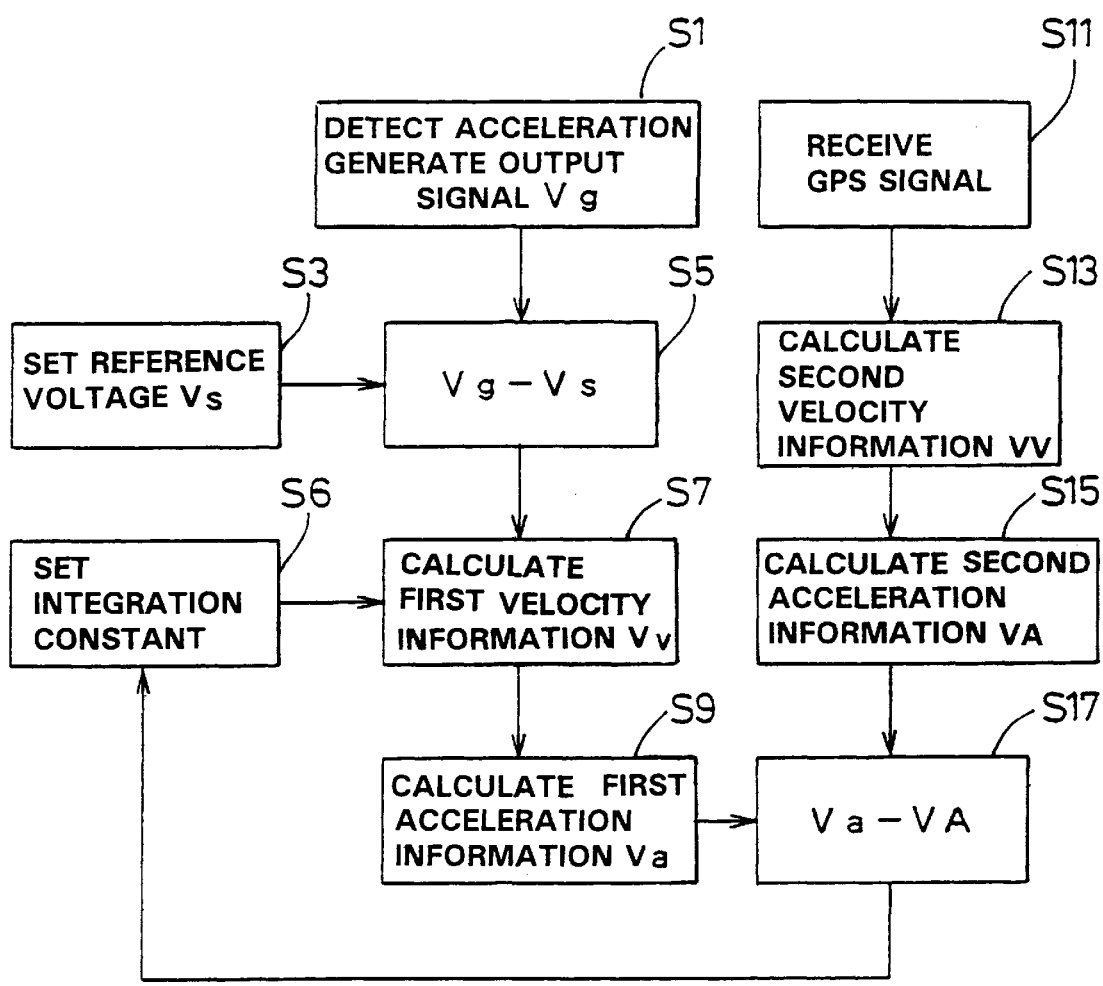
FIG. 3 is a flowchart illustrating another method of operation of the velocity calculating apparatus shown in FIG. 1.

The operation shown in the flowchart illustrated in FIG. 3 differs from that shown in the flowchart illustrated in FIG. 2 in that, in step S3, the reference voltage Vs is set to a voltage (approximately 0 V) which is output when the acceleration sensor 12 does not receive acceleration. Further, an integration constant to be used for integrating the signal Vg−Vs in the time domain in step S7 is specified in new step S6, and the integration constant specified in step S6 is changed in step S17 according to the difference between the signal Va corresponding to the acceleration calculated from the output signal Vg of the acceleration sensor 12 and the signal VA corresponding to the acceleration calculated from the GPS signal.

When the velocity calculating apparatus 10 operates according to the flowchart shown in FIG. 3, the integration constant used for integrating the signal Vg−Vs in the time domain is changed according to the comparison between the first acceleration information (signal Va) obtained from the output signal Vg of the acceleration sensor 12 and the second acceleration information (signal VA) obtained from the GPS signal, which thereby changes the first velocity information (signal Vv) obtained from the output signal Vg of the acceleration sensor. Thus, the effects of temperature drift and the sensitivity-temperature characteristic of the acceleration sensor 12, and the effects of the acceleration of gravity at a slope are compensated for, whereby an error caused by the acceleration sensor 12 is suppressed.

The CPU 16 and the memory 26 are used to process the output signal of the acceleration sensor 12 and the GPS signal in the above embodiment. A plurality of means having the functions corresponding to those of the CPU 16 and the memory 26 may be used instead of the CPU 16 and the memory 26. More generally, the means or apparatus described herein can be broken down into a plurality of functional elements, or combined into larger elements, so long as the relevant functions are performed.

What is claimed is:

1. A velocity calculating apparatus for calculating a velocity in a traveling direction, wherein the velocity calculating apparatus calculates first information based on an output signal of an acceleration sensor which detects acceleration in said traveling direction,
   receives a GPS signal,
   calculates second information based on said GPS signal,
   compensates for errors in the output signal of said acceleration sensor according to the second information, and
   calculates said velocity in said traveling direction according to the compensated output signal from the acceleration sensor.

2. A velocity calculating apparatus according to claim 1, wherein said first information and second information are representative of acceleration in said traveling direction.

3. A method of calculating a velocity in a traveling direction comprising the steps of:
   calculating first information based on an output signal of an acceleration sensor which detects acceleration in said traveling direction,
   receiving a GPS signal,
   calculating second information based on said GPS signal,
   compensating for errors in the output signal of said acceleration sensor according to the second information, and
   calculating said velocity in said traveling direction according to the compensated output signal from the acceleration sensor.

4. A velocity calculating apparatus according to claim 3, wherein said first information and second information are representative of acceleration in said traveling direction.

5. A velocity calculating apparatus comprising:
   an acceleration sensor for detecting acceleration in a traveling direction;
   means for specifying a reference voltage to be used for compensating the output signal of said acceleration sensor;
   means for compensating the output signal of said acceleration sensor according to said reference voltage;
   means for obtaining first velocity information by integrating in the time domain said output signal compensated according to said reference voltage;
   means for obtaining first acceleration information by differentiating said first velocity information in the time domain;
   means for receiving a GPS signal;
   means for obtaining second velocity information from said GPS signal;
   means for obtaining second acceleration information by differentiating said second velocity information in the time domain;
   means for comparing said first acceleration information with said second acceleration information; and
   means for changing said first velocity information according to the comparison between said first acceleration information and said second acceleration information.

6. A velocity calculating apparatus according to claim 5, wherein said means for changing said first velocity information includes means for changing said reference voltage according to the comparison between said first acceleration information and said second acceleration information.

7. A velocity calculating apparatus according to claim 5, wherein said means for changing said first velocity information includes means for changing an integration constant according to the comparison between said first acceleration information and said second acceleration information, said integration constant being used in said means for obtaining said first velocity information.

8. A velocity calculating apparatus according to any one of claims 5 to 7, further comprising:
   an A/D converter connected at its input end to the output end of said acceleration sensor, for converting the output signal of said acceleration sensor to a digital signal;
   a digital converter for converting said GPS signal to a digital signal;
   a serial interface connected at its input end to the output end of said digital converter, for converting the serial data of said digital signal converted from said GPS signal to parallel data;
   a CPU connected to the output end of said A/D converter and the output end of said serial interface, for processing said digital signal converted from the output signal of said acceleration sensor and said digital signal converted from said GPS signal.

9. A method of calculating velocity comprising the steps of:
   detecting acceleration in a traveling direction with an acceleration sensor;
   specifying a reference voltage to be used for compensating the output signal of said acceleration sensor;
   compensating the output signal of said acceleration sensor according to said reference voltage;
   obtaining first velocity information by integrating in the time domain said output signal compensated according to said reference voltage;
   obtaining first acceleration information by differentiating said first velocity information in the time domain;
   receiving a GPS signal;
   obtaining second velocity information from said GPS signal;
   obtaining second acceleration information by differentiating said second velocity information in the time domain;
   comparing said first acceleration information with said second acceleration information; and
   changing said first velocity information according to the comparison between said first acceleration information and said second acceleration information.

10. A method according to claim 9, wherein said step of changing said first velocity information includes the step of changing said reference voltage according to the comparison between said first acceleration information and said second acceleration information.

11. A method according to claim 9, wherein said step of changing said first velocity information includes the step of changing an integration constant according to the comparison between said first acceleration information and said second acceleration information, said integration constant being used in said means for obtaining said first velocity information.

12. A velocity calculating apparatus comprising:
an acceleration sensor detecting acceleration in a traveling direction;
apparatus specifying a reference voltage to be used for compensating the output signal of said acceleration sensor;
apparatus compensating the output signal of said acceleration sensor according to said reference voltage;
apparatus obtaining first velocity information by integrating in the time domain said output signal compensated according to said reference voltage;
apparatus obtaining first acceleration information by differentiating said first velocity information in the time domain;
apparatus receiving a GPS signal;
apparatus obtaining second velocity information from said GPS signal;
apparatus obtaining second acceleration information by differentiating said second velocity information in the time domain;
apparatus comparing said first acceleration information with said second acceleration information; and
apparatus changing said first velocity information according to the comparison between said first acceleration information and said second acceleration information.

13. A velocity calculating apparatus according to claim 12, wherein said apparatus changing said first velocity information includes apparatus changing said reference voltage according to the comparison between said first acceleration information and said second acceleration information.

14. A velocity calculating apparatus according to claim 12, wherein said apparatus changing said first velocity information includes apparatus changing an integration constant according to the comparison between said first acceleration information and said second acceleration information, said integration constant being used in said apparatus obtaining said first velocity information.

15. A velocity calculating apparatus according to any one of claims 12 to 14, further comprising:
an A/D converter connected at its input end to the output end of said acceleration sensor, for converting the output signal of said acceleration sensor to a digital signal;
a digital converter for converting said GPS signal to a digital signal;
a serial interface connected at its input end to the output end of said digital converter, for converting the serial data of said digital signal converted from said GPS signal to parallel data;
a CPU connected to the output end of said A/D converter and the output end of said serial interface, for processing said digital signal converted from the output signal of said acceleration sensor and said digital signal converted from said GPS signal.

16. A velocity calculating apparatus for calculating a velocity in a traveling direction, comprising:
an acceleration sensor which detects acceleration in a traveling direction;
a GPS receiver which receives a GPS signal;
a processor which:
specifies a reference voltage to be used for compensating the output signal of said acceleration sensor;
compensates the output signal of said acceleration sensor according to said reference voltage;
obtains first velocity information by integrating in the time domain said output signal compensated according to said reference voltage;
obtains first acceleration information by differentiating said first velocity information in the time domain;
obtains second velocity information from said GPS signal;
obtains second acceleration information by differentiating said second velocity information in the time domain;
compares said first acceleration information with said second acceleration information; and
changes said first velocity information according to the comparison between said first acceleration information and said second acceleration information and outputs said velocity in said traveling direction.

17. A velocity calculating apparatus according to claim 16, wherein said processor changes said first velocity information by changing said reference voltage according to the comparison between said first acceleration information and said second acceleration information.

18. A velocity calculating apparatus according to claim 16, wherein said processor changes said first velocity information by changing an integration constant according to the comparison between said first acceleration information and said second acceleration information, said integration constant being used in said processor for obtaining said first velocity information.

19. A velocity calculating apparatus according to any one of claims 16 to 18, further comprising:
an A/D converter connected at its input end to the output end of said acceleration sensor, for converting the output signal of said acceleration sensor to a digital signal;
a digital converter for converting said GPS signal to a digital signal;
a serial interface connected at its input end to the output end of said digital converter, for converting the serial data of said digital signal converted from said GPS signal to parallel data;
said processor being connected to the output end of said A/D converter and the output end of said serial interface, for processing said digital signal converted from the output signal of said acceleration sensor and said digital signal converted from said GPS signal.

* * * * *